United States Patent
Kim et al.

(10) Patent No.: US 10,921,547 B2
(45) Date of Patent: Feb. 16, 2021

(54) LENS DRIVING APPARATUS, AND CAMERA MODULE AND OPTICAL DEVICE COMPRISING SAME

(71) Applicant: LG INNOTEK CO., LTD., Seoul (KR)

(72) Inventors: Jung Cheol Kim, Seoul (KR); Kap Jin Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 16/495,339

(22) PCT Filed: Mar. 23, 2018

(86) PCT No.: PCT/KR2018/003416
§ 371 (c)(1),
(2) Date: Sep. 18, 2019

(87) PCT Pub. No.: WO2018/182239
PCT Pub. Date: Oct. 4, 2018

(65) Prior Publication Data
US 2020/0096729 A1 Mar. 26, 2020

(30) Foreign Application Priority Data
Mar. 29, 2017 (KR) .................. 10-2017-0040003

(51) Int. Cl.
*G02B 7/09* (2006.01)
*G03B 3/10* (2006.01)
(Continued)

(52) U.S. Cl.
CPC ............... *G02B 7/09* (2013.01); *G03B 3/10* (2013.01); *H04N 5/2254* (2013.01); *G03B 2205/0069* (2013.01)

(58) Field of Classification Search
CPC .......... G02B 7/09; G02B 27/646; G02B 7/08; G03B 3/10; G03B 2205/0069; G03B 5/02; G03B 17/12; H04N 5/2254
(Continued)

(56) References Cited

U.S. PATENT DOCUMENTS 8,279,289 B2 * 10/2012 Nagata ............... H04N 5/23287
348/208.11
2010/0007973 A1 * 1/2010 Sata ..................... G02B 7/026
359/824
(Continued)

FOREIGN PATENT DOCUMENTS

JP 2012-83720 A 4/2012
JP 2015-99322 A 5/2015
(Continued)

*Primary Examiner* — Albert H Cutler
(74) *Attorney, Agent, or Firm* — Birch, Stewart, Kolasch & Birch, LLP

(57) ABSTRACT

An embodiment comprises: a housing comprising a first protrusion and a second protrusion on the lower part; a bobbin disposed inside the housing; a first coil disposed on the bobbin; a magnet disposed in the housing and opposite from the first coil; a second coil disposed on the outer lateral surface of the housing; an upper elastic member coupled to the upper part of the bobbin; and a lower elastic member coupled to the lower part of the bobbin. The lower elastic member comprises a first spring, a second spring, a third spring and a fourth spring which are disposed away from each other. One part of the second coil is wound at least once around the first protrusion and is connected to the first spring. The other part of the second coil is wound at least once around the second protrusion and is connected to the second spring.

20 Claims, 10 Drawing Sheets

(51) Int. Cl.
  *H04N 5/225*   (2006.01)
  *G02B 27/64*   (2006.01)
  *G02B 7/08*    (2006.01)
  *G03B 5/02*    (2006.01)
  *G03B 17/12*   (2006.01)

(58) Field of Classification Search
  USPC ................................ 348/345, 357, 373, 374
  See application file for complete search history.

(56) References Cited

U.S. PATENT DOCUMENTS

| | | | |
|---|---|---|---|
| 2011/0157367 A1* | 6/2011 | Chang | H04N 7/181 |
| | | | 348/159 |
| 2012/0120506 A1 | 5/2012 | Yamauchi | |
| 2013/0107068 A1* | 5/2013 | Kim | H04N 5/23258 |
| | | | 348/208.11 |
| 2015/0077628 A1* | 3/2015 | Kim | H04N 5/2253 |
| | | | 348/374 |
| 2015/0153539 A1* | 6/2015 | Yoo | H04N 5/2254 |
| | | | 348/373 |
| 2015/0207983 A1* | 7/2015 | Kang | H04N 5/2257 |
| | | | 348/349 |
| 2015/0253583 A1 | 9/2015 | Cho et al. | |
| 2016/0316121 A1 | 10/2016 | Park | |

FOREIGN PATENT DOCUMENTS

| | | | |
|---|---|---|---|
| JP | 20150099322 | * | 5/2015 |
| JP | 2015-191213 A | | 11/2015 |
| JP | 2015191213 | * | 11/2015 |
| KR | 10-0836031 B1 | | 6/2008 |
| KR | 10-2012-0051492 A | | 5/2012 |
| KR | 10-2015-0097998 A | | 8/2015 |
| KR | 10-2015-0104388 A | | 9/2015 |

* cited by examiner

LENS DRIVING APPARATUS, AND CAMERA MODULE AND OPTICAL DEVICE COMPRISING SAME

CROSS REFERENCE TO RELATED APPLICATIONS

This application is the National Phase of PCT International Application No. PCT/KR2018/003416, filed on Mar. 23, 2018, which claims priority under 35 U.S.C. 119(a) to Patent Application No. 10-2017-0040003, filed in the Republic of Korea on Mar. 29, 2017, all of which are hereby expressly incorporated by reference into the present application.

TECHNICAL FIELD

Embodiments relate to a lens moving apparatus and a camera module and an optical instrument including the same.

BACKGROUND ART

It is difficult to apply technology related to a voice coil motor (VCM) used in a conventional general camera module to a low-power-consumption-type subminiature camera module. For this reason, research related thereto has been actively conducted.

The demand for electronic products, such as a smartphone and a cellular phone equipped with a camera, and the production of such electronic products have increased. A camera for cellular phones has been developed so as to have a large number of pixels and to be realized in miniature. As a result, an actuator has also been developed so as to have a small size, a large diameter, and multiple functions. In order to realize a high-resolution camera for cellular phones, an improvement in the function of the camera for cellular phones, auto focusing, the reduction of shutter shaking, and additional functions, such as a zoom function, are required.

DISCLOSURE

Technical Problem

Embodiments provide a lens moving apparatus configured such that a soldering process is directly performed without separate wire arrangement for a second coil at the time of soldering between the second coil and lower springs and such that the movement or shaking of the second coil is prevented at the time of soldering, thereby improving solderability, and a camera module and an optical instrument including the same.

Technical Solution

In one embodiment, a lens moving apparatus includes a housing including a first protrusion and a second protrusion at the lower portion thereof, a bobbin disposed in the housing, a first coil disposed in the bobbin, a magnet disposed in the housing, the magnet being disposed so as to correspond to the first coil, a second coil disposed on the outer surface of the housing, an upper elastic member coupled to the upper portion of the bobbin, and a lower elastic member coupled to the lower portion of the bobbin, wherein the lower elastic member includes a first spring, a second spring, a third spring, and a fourth spring disposed so as to be spaced apart from each other, a portion of the second coil is wound around the first protrusion at least once and is connected to the first spring, and another portion of the second coil is wound around the second protrusion at least once and is connected to the second spring.

A portion of the first coil may be connected to the third spring, and another portion of the first coil may be connected to the fourth spring.

The lower elastic member may include an inner frame coupled to the lower portion of the bobbin, an outer frame coupled to the housing, and a connection portion connecting the inner frame and the outer frame to each other.

The second coil may include a first portion disposed at the outer surface of the housing, a second portion wound around the first protrusion, a third portion connecting one end of the first portion and one end of the second portion to each other, a fourth portion wound around the second protrusion, and a fifth portion connecting the other end of the first portion and one end of the fourth portion to each other.

The lens moving apparatus may further include a first solder portion, disposed on the outer frame of the first spring and on the second portion of the second coil, and a second solder portion, disposed on the outer frame of the second spring and on the fourth portion of the second coil.

The second coil may include a sixth portion, extending from the other end of the second portion to the outer frame, and a seventh portion, extending from the other end of the fourth portion to the outer frame.

The lens moving apparatus may further include a third solder portion, disposed on the outer frame of the first spring and on the sixth portion of the second coil, and a fourth solder portion, disposed on the outer frame of the second spring and on the seventh portion of the second coil.

The third portion of the second coil may be disposed at a first corner portion of the housing, and the fifth portion of the second coil may be disposed at a second corner portion of the housing, which is adjacent to the first corner portion.

The outer surface of the housing may include a first recess, in which the first portion of the second coil is disposed, a second recess, in which the third portion of the second coil is disposed, the second recess being connected to the first recess, and a third recess, in which the fifth portion of the second coil is disposed, the third recess being connected to the first recess.

The second coil may not overlap the first coil in a direction parallel to an optical axis, the first portion of the second coil may not overlap the first coil in a direction perpendicular to the optical axis, and the second coil may be located above the first coil based on the lower portion of the bobbin.

Advantageous Effects

According to embodiments, it is possible to directly perform a soldering process without separate wire arrangement for a second coil at the time of soldering between the second coil and lower springs and to prevent movement or shaking of the second coil at the time of soldering, thereby improving solderability.

BEST MODE

Figure 1:
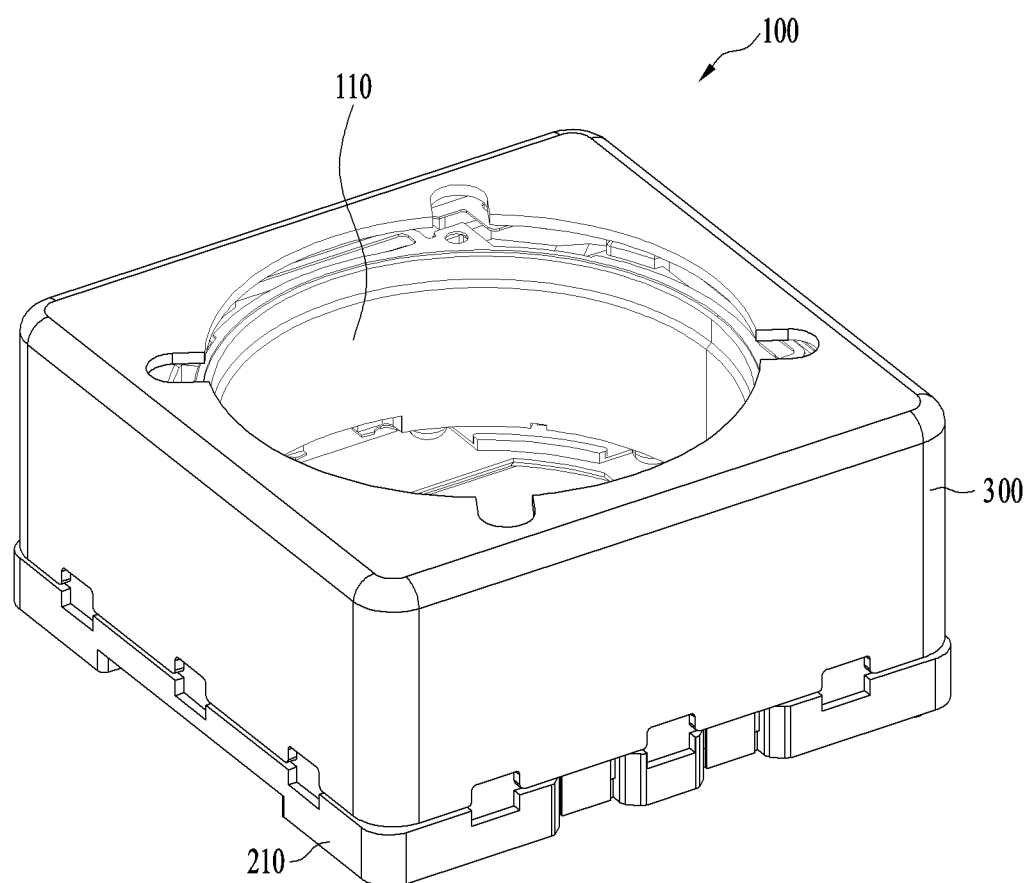
FIG. 1 is a perspective view showing a lens moving apparatus according to an embodiment.

Reference will now be made in detail to embodiments, examples of which are illustrated in the accompanying drawings. In the following description of the embodiments, it will be understood that when an element, such as a layer (film), a region, a pattern, or a structure is referred to as being "on" or "under" another element, such as a substrate, a layer (film), a region, a pad, or a pattern, it can be "directly" on or under another element or can be "indirectly" formed such that an intervening element is also present. In addition, terms such as "on" or "under" should be understood on the basis of the drawings. Wherever possible, the same reference numbers will be used throughout the drawings to refer to the same or like parts.

Hereinafter, a lens moving apparatus according to an embodiment will be described with reference to the accompanying drawings. For the convenience of description, the lens moving apparatus will be described using a Cartesian coordinate system (x, y, z). However, the disclosure is not limited thereto. Other different coordinate systems may be used. In the drawings, an x-axis direction and a y-axis direction are directions perpendicular to a z-axis direction, which is an optical-axis direction. The optical axis (OA) direction or the z-axis direction, which is parallel to the optical-axis (OA) direction, may be referred to as a "first direction," the x-axis direction may be referred to a "second direction," and the y-axis direction may be referred to a "third direction."

An "auto-focusing device," which is applied to a small-sized camera module of a mobile device, such as a smartphone or a tablet PC, is a device for automatically focusing an image of a subject on an image sensor. The auto-focusing device may be variously configured. In an embodiment, the lens moving apparatus may move an optical module including at least one lens in the first direction to perform an auto focusing operation.

Figure 2:
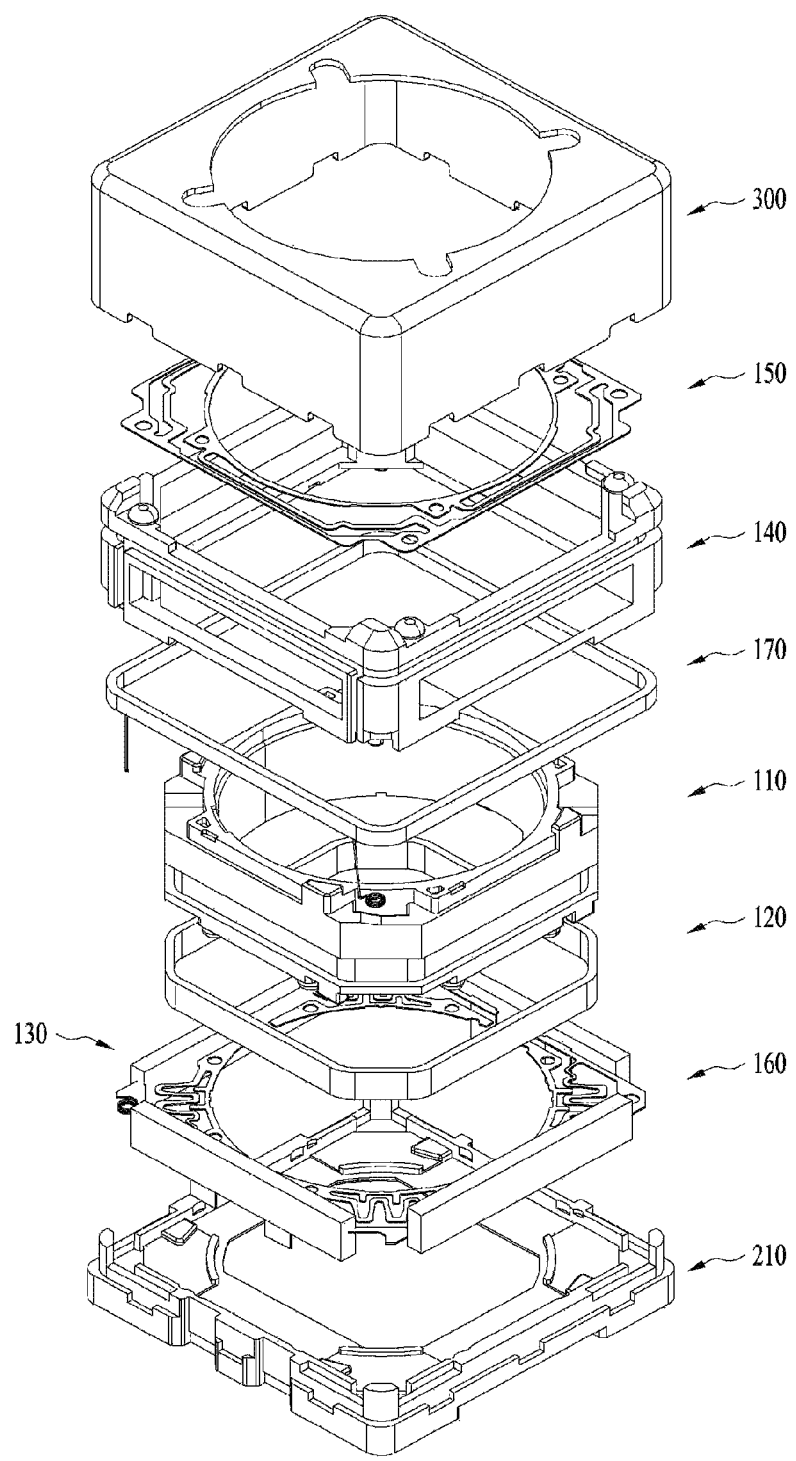
FIG. 2 is an exploded view of the lens moving apparatus shown in FIG. 1.
Figure 3:
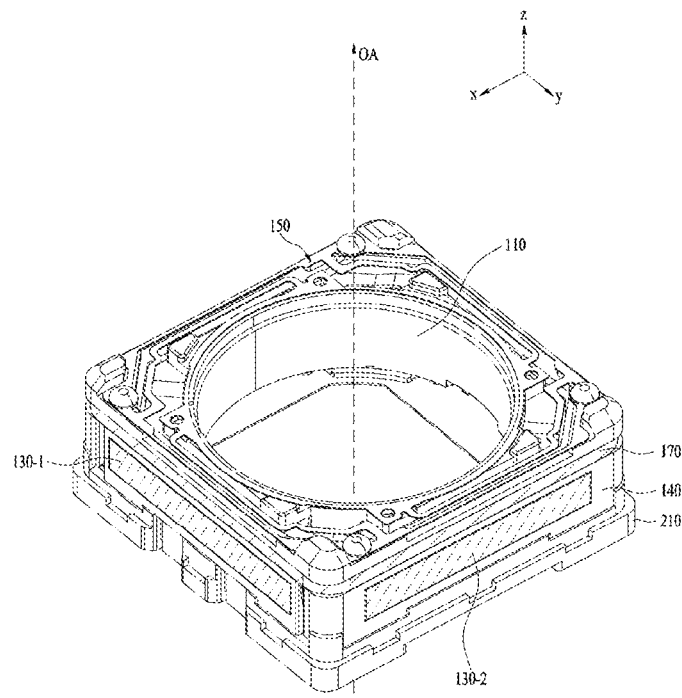
FIG. 3 is a perspective view of the lens moving apparatus with the cover member shown in FIG. 1 removed.

FIG. 1 is a perspective view showing a lens moving apparatus 100 according to an embodiment, FIG. 2 is an exploded view of the lens moving apparatus 100 shown in FIG. 1, and FIG. 3 is a perspective view of the lens moving apparatus 100 with the cover member 300 shown in FIG. 1 removed.

Referring to FIGS. 1 to 3, the lens moving apparatus 100 includes a bobbin 110, a first coil 120, a magnet 130, a housing 140, an upper elastic member 150, a lower elastic member 160, a second coil 170, a base 210, and a cover member 300.

First, the cover member 300 will be described.

The cover member 300 receives the bobbin 110, the first coil 120, the magnet 130, the housing 140, the upper elastic member 150, the lower elastic member 160, and the second coil 170 in a receiving space formed together with the base 210.

The cover member 300 may be formed in the shape of a box, the lower portion of which is open and which includes an upper plate and side plates. The shape of the upper plate of the cover member 300 may be polygonal, for example, quadrangular or octagonal. The lower ends of the side plates of the cover member 300 may abut the edge of the upper surface of the base 210, and may be coupled to each other via an adhesive.

The cover member 300 may be provided in the upper plate thereof with an opening, through which a lens (not shown) coupled to the bobbin 110 is exposed to external light. Also, in order to prevent foreign matter, such as dust or moisture, from permeating into the camera module, a window made of an optically transmissive material may be further provided in the opening in the cover member 300.

The cover member 300 may be made of a nonmagnetic material, such as SUS, in order to prevent a phenomenon in which the magnet 130 attracts the cover member. However, the disclosure is not limited thereto. In another embodiment, the cover member 300 may be made of a magnetic material, and may function as a yoke for increasing electromagnetic force due to interaction with the first coil 120.

Next, the bobbin 110 will be described.

Figure 4:
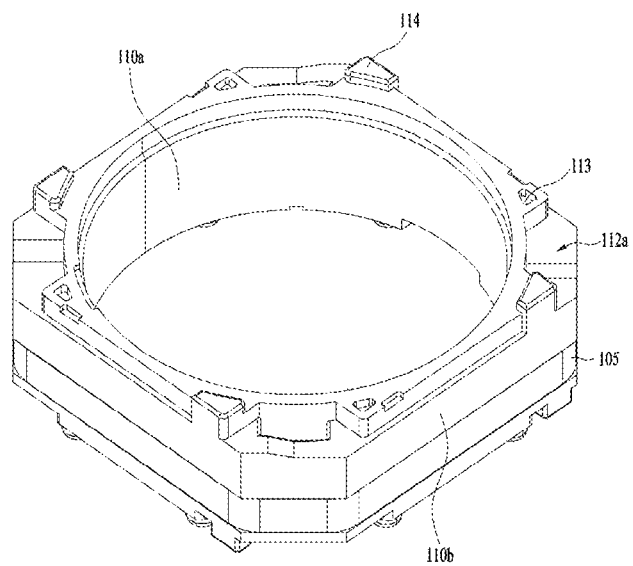
FIG. 4 is a first perspective view of the bobbin shown in FIG. 1.
Figure 5:
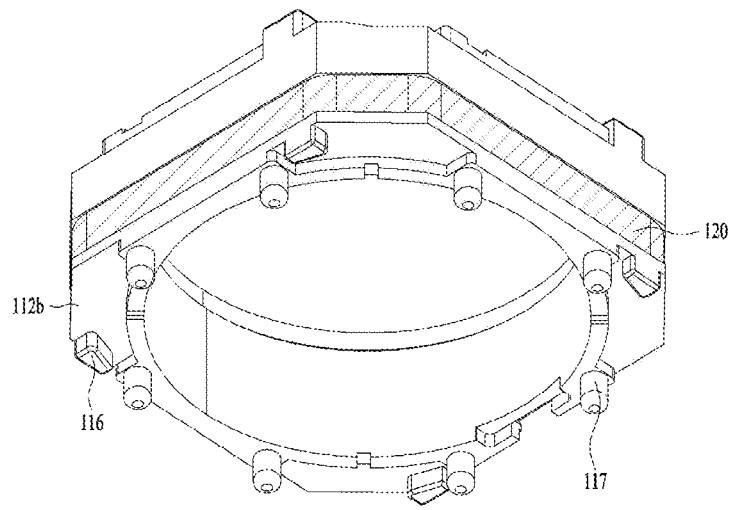
FIG. 5 is a second perspective view of the bobbin and the first coil shown in FIG. 1.

FIG. 4 is a first perspective view of the bobbin 110 shown in FIG. 1, and FIG. 5 is a second perspective view of the bobbin 110 and the first coil 120 shown in FIG. 1.

Referring to FIGS. 4 and 5, the bobbin 110 may be disposed inside the housing 140, and may be moved in the first direction due to electromagnetic interaction between the coil 120 and the magnet 130.

The lens (not shown) may be directly coupled to the inner circumferential surface 110a of the bobbin 110. However, the disclosure is not limited thereto. For example, the bobbin 110 may include a lens barrel (not shown), in which at least one lens is mounted. The lens barrel LB2 may be coupled inside the bobbin 110 in various manners.

The bobbin 110 may have an opening in which the lens or the lens barrel is mounted. The shape of the opening in the bobbin 110 may coincide with the shape of the lens or the lens barrel mounted in the opening. For example, the shape of the opening in the bobbin 110 may be circular, oval, or polygonal. However, the disclosure is not limited thereto.

The bobbin 110 may have at least one coupling recess 113, which is disposed in the upper surface thereof so as to be coupled and fixed to an inner frame 151 of the upper elastic member 150, and at least one protrusion or coupling protrusion 117, which is disposed on the lower surface thereof so as to be coupled and fixed to an inner frame 161 of the lower elastic member 160. In another embodiment, the portion of the bobbin 110 that is coupled to the inner frame of the upper elastic member 150 may be a coupling protrusion, rather than the coupling recess.

The bobbin 110 may have an upper escape recess 112a, which is provided in the region of the upper surface thereof that corresponds to or is aligned with a first connection portion 153 of the upper elastic member 150.

In addition, the bobbin 110 may have a lower escape recess 112b, which is provided in the region of the lower surface thereof that corresponds to or is aligned with a second connection portion 163 of the lower elastic member 160.

When the bobbin 110 is moved in the first direction, spatial interference between the first connection portion 153 and the bobbin 110 and between the second connection portion 163 and the bobbin 110 may be removed by the upper escape recess 112a and the lower escape recess 112b of the bobbin 110, whereby the first connection portion 153 and the second connection portion 163 may be more easily elastically deformed.

In another embodiment, the first connection portion of the upper elastic member and the bobbin may be designed so as not to interfere each other, whereby no upper escape recess and/or no lower escape recess may be provided in the bobbin.

The bobbin 110 may have a first stopper 114, which protrudes upwards from the upper surface thereof, and a second stopper 116, which protrudes downwards from the lower surface thereof. When the bobbin 110 is moved in the first direction for auto focusing, the first stopper 114 and the second stopper 116 may function to prevent the upper surface of the bobbin 110 from directly colliding with the inner wall of the cover member 300 or the upper surface of the base 210 in the case in which the bobbin 110 deviates from a prescribed range due to an external impact.

The bobbin 110 may be provided in the outer circumferential surface 110b thereof with at least one recess 105, in which the first coil 120 is disposed.

The first coil 120 may be disposed or settled in the recess 105, or the first coil 120 may be directly wound in the recess 105 of the bobbin 110 about the optical axis OA in a clockwise direction or in a counterclockwise direction.

The shape and number of recesses 105 in the bobbin 110 may correspond to the shape and number of coils disposed around the outer circumferential surface of the bobbin 110. In another embodiment, the bobbin 110 may have no recess for coil settlement, and the first coil 120 may be directly wound and fixed around the outer circumferential surface of the bobbin 110 having no recess therein.

Next, the first coil 120 will be described.

The first coil 120 is disposed around the outer circumferential surface 110b of the bobbin 110, and electromagnetically interacts with the magnet 130, which is disposed in the housing 140.

In order to generate electromagnetic force due to electromagnetic interaction with the magnet 130, a driving signal may be applied to the first coil 120. At this time, the driving signal may include an alternating-current signal, or may include an alternating-current signal and a direct-current signal. For example, the alternating-current signal may be a sinusoidal signal or a pulse signal (e.g. a PWM signal).

The bobbin 110, which is elastically supported by the upper elastic member 150 and the lower elastic member 160 may be moved in the first direction by the electromagnetic force due to electromagnetic interaction between the first coil 120 and the magnet 130. The intensity of the driving signal and/or the polarity of the driving signal may be controlled in order to control the intensity and/or the direction of the electromagnetic force. The movement of the bobbin 110 in the first direction may be controlled by the controlled electromagnetic force, whereby the auto focusing function may be performed for the lens moving apparatus.

The first coil 120 may be wound so as to wrap the outer circumferential surface 110b of the bobbin 110 about the optical axis in the clockwise direction or in the counterclockwise direction.

For example, the first coil 120 may have a closed-loop shape that wraps the outer circumferential surface of the bobbin 110.

For example, the first coil 120 may be disposed or wound in the recess 105 provided in the outer circumferential surface 110b of the bobbin 110.

In another embodiment, the first coil 120 may be realized as a coil ring wound about an axis perpendicular to the optical axis in the clockwise direction or in the counterclockwise direction. The number of coil rings may be equal to the number of magnets 130. However, the disclosure is not limited thereto.

The first coil 120 may be connected to at least one of the upper elastic member 150 or the lower elastic member 160. For example, a portion or one end of the first coil 120 may be coupled to one of the upper elastic member 150 and the lower elastic member 160 using a solder or a conductive adhesive, and another portion or the other end of the first coil 120 may be coupled to one of the upper elastic member 150 and the lower elastic member 160 using a solder or a conductive adhesive.

A driving signal may be applied to the first coil 120 through at least one of the upper elastic member 150 or the lower elastic member 160.

Next, the housing 140 will be described.

Figure 6:
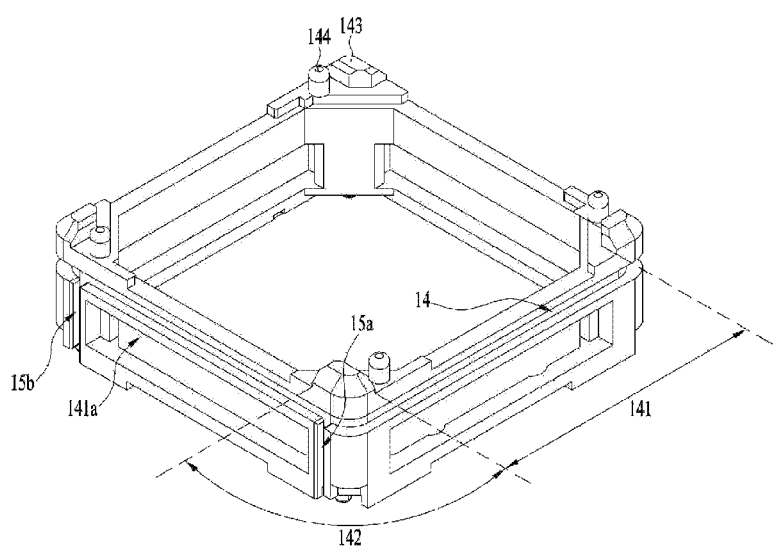
FIG. 6 is a perspective view of the housing shown in FIG. 1.
Figure 7:
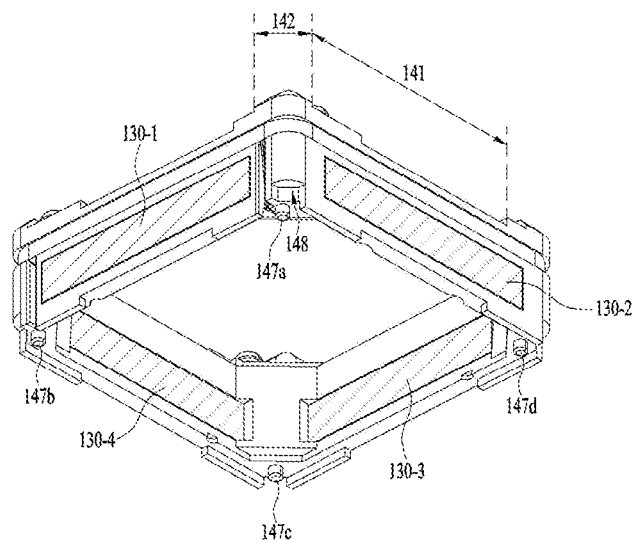
FIG. 7 is a perspective view showing coupling between the housing and the magnet shown in FIG. 1.

FIG. 6 is a perspective view of the housing 140 shown in FIG. 1, and FIG. 7 is a perspective view showing coupling between the housing 140 and the magnet 130 shown in FIG. 1.

Referring to FIGS. 6 and 7, the housing 140 supports the magnet 130, and receives the bobbin 110 therein such that the bobbin 110 is movable in the first direction.

The housing 140 may generally have a pillar shape including an opening, and may include first edges 141 and second edges 142.

For example, the housing 140 may have a plurality of edges 141 and 142 that define a polygonal (e.g. a quadrangular or octagonal) or circular hollow portion. The upper surfaces of the edges 141 and 142 may define the upper surface of the housing 140.

For example, the housing 140 may include first edges 141 spaced apart from each other and second edges 142 spaced apart from each other. Each of the second edges may be disposed between two adjacent first edges, and may interconnect the two adjacent first edges.

For example, the first edges 141 of the housing 140 may be disposed at positions corresponding to the side plates of the cover member 300.

For example, the first edges 141 of the housing 140 may be portions corresponding to the sides of the housing 140, and the second edges 142 of the housing 140 may be portions corresponding to the corners of the housing 140. The first edges 141 of the housing 140 may be referred to as "edge portions," and the second edges 142 of the housing 140 may be referred to as "corner portions."

For example, the housing 140 may include four edge portions (e.g. first to fourth edge portions) and four corner portions (e.g. first to fourth corner portions).

The magnet 130 may be disposed or mounted in each of the first edges 141 of the housing 140. For example, a recess 141a, in which the magnet 130 is settled, disposed, or fixed, may be provided in at least one of the first edges 141 of the housing 140.

In FIG. 5, the recesses 141a are formed through the first edges 141. However, the disclosure is not limited thereto. The recesses may be concave recesses. In another embodiment, a recess in which the magnet 130 is settled may be provided in the inner surface of each of the first edges 141.

In addition, a first recess 14, in which the second coil 170 is wound or received, may be provided in the housing 140. The first recess 14 may be referred to as a settlement recess.

The first recess 14 may be provided in the outer surface of the housing 140. For example, the first recess 14 may be provided in the outer surface of at least one of the first edges 141 or the second edges 142 of the housing 140 in a concave shape.

In addition, for example, the first recess 14 may be formed in the outer surface of each of the first edges 141 and/or the second edges 142, and may have a ring shape.

For example, the first recess 14 of the housing 140 may be provided in the upper end of the outer surface of each of the first edges 141 and the second edges 142. For example, the first recess 14 of the housing 140 may be located above the recess 141a, in which the magnet is received, may be located under the upper surface of the housing 140, and may be spaced apart from the recess 141a.

For example, the first recess 14 may not overlap the recess 141a in a direction perpendicular to the optical axis OA. However, the disclosure is not limited thereto.

For example, the first recess 14 of the housing 140 may be spaced apart from the upper surface of the housing 140, and the depth of the first recess 14 may be greater than or equal to the thickness of the second coil 170 wound therein. For example, the second coil 170 disposed in the first recess 14 may not protrude from the outer surface of each of the first edges of the housing 140 and the outer surface of each of the second edges of the housing 140. The reason for this is that it is necessary to prevent the second coil 170 disposed in the first recess 14 from deviating from the first recess 14.

The housing 140 may have an upper stopper 143, which protrudes from the upper surface thereof. For example, the upper stopper 143 may be disposed on the upper surface of each of the second edges. However, the disclosure is not limited thereto.

The upper stopper 143 of the housing 140 prevents a collision between the cover member 130 and the housing 140. When an external impact occurs, it is possible to prevent the upper surface of the housing 140 from directly colliding with the inner surface of the upper portion of the cover member 300.

In addition, a protrusion 144 or an upper protrusion, to which an outer frame 152 of the upper elastic member 150 is coupled, may be provided on the upper portion of the housing 140.

For example, the protrusion 144 may be disposed on the upper portion of each of the second edges 142 of the housing 140 so as to be spaced apart from the upper stopper 144. However, the disclosure is not limited thereto.

The housing 140 may be provided on the lower surface thereof with at least one protrusion 147a to 147d or at least one lower protrusion, to which an outer frame 162 of the lower elastic member 160 is coupled.

For example, the protrusions 147a to 147d may be disposed on the lower portions of the second edges 142 of the housing 140.

A lower guide recess 148, into which a guide member 216 of the base 210 is inserted, fastened, or coupled, may be provided in the lower portion of each of the second edges 142 of the housing 140.

For example, the lower guide recess 148 of the housing 140 and the guide member 216 of the base 210 may be coupled to each other via an adhesive member, and the housing 140 may be coupled to the base 210.

A second recess 15a, in which a third portion 17c of the second coil 170 is disposed, and a third recess 15b, in which a fifth portion 17e of the second coil 170 is disposed, may be provided in at least one of the first edges of the housing 140. The second recess 15a and the third recess 15b will be described below.

Next, the magnet 130 will be described.

At an initial position of the bobbin 110, the magnet 130 may be disposed in each of the edge portions of the housing 140 so as to correspond to or to be aligned with the first coil 120.

Here, the initial position of the bobbin 110 may be the original position of an AF operation unit in the state in which no electric power is applied to the first coil 120 or the position at which the AF operation unit is located as the result of the upper elastic member 150 and the lower elastic member 160 being elastically deformed due only to the weight of the AF operation unit.

For example, the initial position of the bobbin 110 may be the position at which the AF operation unit is located when the gravity acts in the direction from the bobbin 110 to the base 210 or when the gravity acts in the direction from the base 210 to the bobbin 110. The AF operation unit may include the bobbin 110 and the components mounted in the bobbin 110, such as the first coil 120.

For example, the magnet 130 may be disposed in the recess 141a of the housing 140 so as to overlap or face the first coil 120 in a direction perpendicular to the optical axis.

In another embodiment, no recess 141a may be formed in each of the first edges 141 of the housing 140, or the magnet 130 may be disposed in one of the outer surface and the inner surface of each of the first edges 141 of the housing 140.

The magnet 130 may include four magnets 130-1 to 140-4, which are disposed in the four edge portions of the housing 140.

The shape of the magnet 130 may have a shape corresponding to each of the first edges 141 of the housing 140, for example, a rectangular parallelepiped shape. However, the disclosure is not limited thereto.

The magnet 130 may be a monopolar magnetized magnet or a bipolar magnetized magnet disposed such that the surface thereof facing the first coil 120 has an S pole and the surface opposite thereto has an N pole. However, the disclosure is not limited thereto. The reverse construction is also possible. In addition, the positions of the S pole and the N pole of the magnet 130 may be set such that electromagnetic force due to interaction is generated depending on the disposition of the first coil 120.

In this embodiment, the number of magnets 130 is four. However, the disclosure is not limited thereto. The number of magnets 130 may be at least two. The surface of each of the magnets 130 that faces the first coil 120 may be planar. However, the disclosure is not limited thereto. The surface of the magnet may be curved.

Next, the upper elastic member 150 and the lower elastic member 160 will be described.

Figure 8:
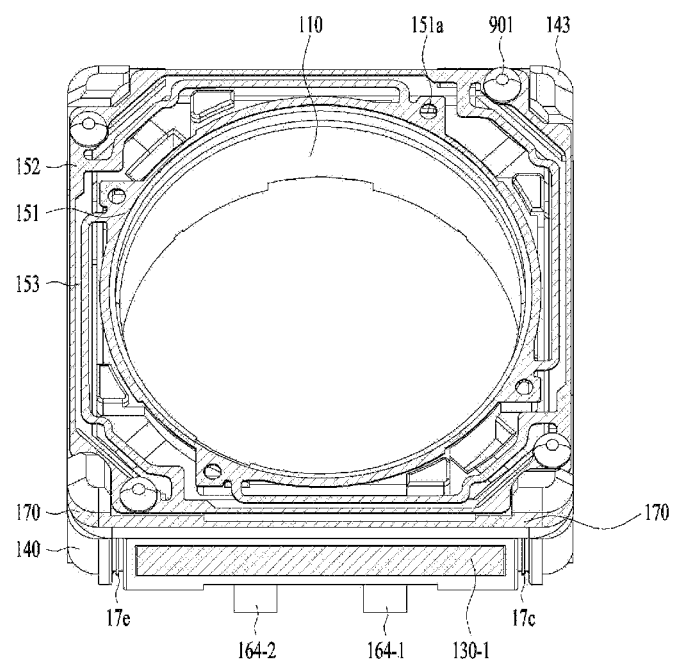
FIG. 8 is a top perspective view of FIG. 2 with a base omitted.
Figure 9:
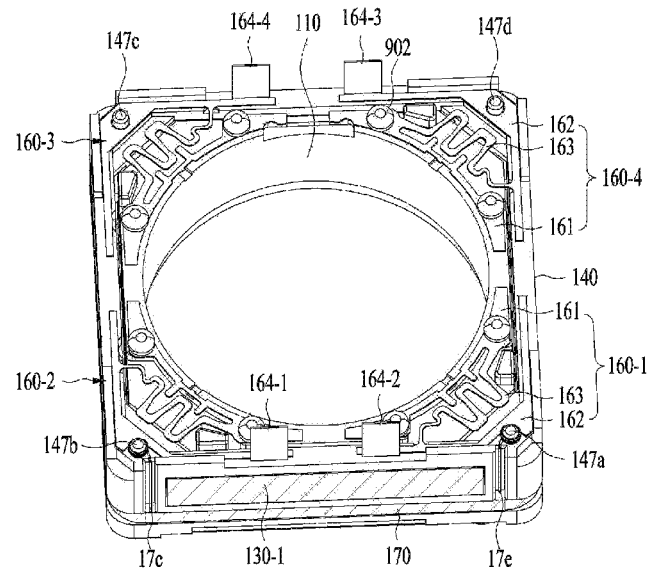
FIG. 9 is a bottom perspective view of FIG. 8.
Figure 10:
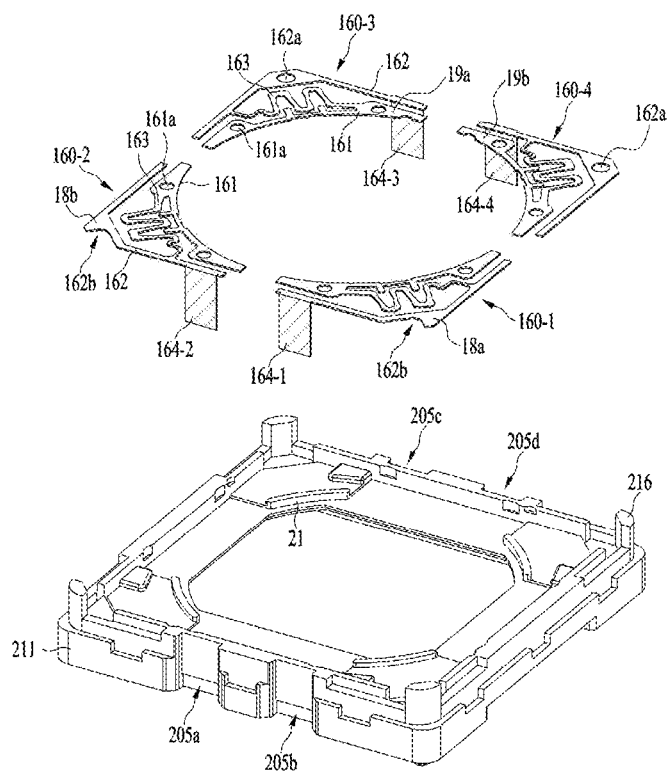
FIG. 10 is a perspective view of the base and a lower elastic member, which are separated from each other.

FIG. 8 is a top perspective view of FIG. 2 with the base 210 omitted, FIG. 9 is a bottom perspective view of FIG. 8, and FIG. 10 is a perspective view of the base 210 and the lower elastic member 160, which are separated from each other.

Referring to FIGS. 8 to 10, the upper elastic member 150 and the lower elastic member 160 are coupled to the bobbin 110 and to the housing 140, and flexibly support the bobbin 110.

For example, the upper elastic member 150 may be coupled to the upper portion (the upper surface or the upper end) of the bobbin 110 and to the upper portion (the upper surface or the upper end) of the housing 140.

In addition, for example, the lower elastic member 160 may be coupled to the lower portion (the lower surface or the lower end) of the bobbin 110 and to the lower portion (the lower surface or the lower end) of the housing 140.

In FIG. 8, the upper elastic member 150 is not divided into a plurality of members. However, the disclosure is not limited thereto. In another embodiment, the upper elastic member 150 may include a plurality of springs or a plurality of upper springs that are spaced apart from each other.

The upper elastic member 150 may include a first inner frame 151 coupled to the upper portion of the bobbin 110, a first outer frame 152 coupled to the upper portion of the housing 140, and a first connection portion 153 for interconnecting the first inner frame 151 and the first outer frame 152.

A through hole 151a, which is coupled to the coupling recess 113 of the bobbin 110 via solder or a conductive adhesive, may be provided in the first inner frame 151 of the upper elastic member 150. In addition, a through hole (not shown), which is coupled to the protrusion 144 of the housing 140 via solder or a conductive adhesive 901, may be provided in the first outer frame 152 of the upper elastic member 150.

The lower elastic member 160 may include two or more springs or lower springs that are divided from each other.

For example, the lower elastic member 160 may include first to fourth lower springs 160-1 to 160-4, which are spaced apart or separated from each other, and the first to fourth lower springs 160-1 to 160-4 may be electrically separated from each other. The first to fourth lower springs 160-1 to 160-4 may also be referred to as first to fourth springs.

For example, the first coil 120 may be connected to two of the springs 160-1 to 160-4, and the second coil 170 may be connected to the other two of the springs 160-1 to 160-4.

Each of the first to fourth lower springs 160-1 to 160-4 may include a second inner frame 161 coupled to the lower portion of the bobbin 110, a second outer frame 162 coupled to the lower portion of the housing 140, and a second connection portion 163 for interconnecting the second inner frame 161 and the second outer frame 162.

A through hole 161a (see FIG. 10), which is coupled to the protrusion 117 of the bobbin 110 via solder 902, may be provided in the second inner frame 161 of the lower elastic member 160.

A through hole 162a, into which each of the protrusions 147c and 147d of the housing 140 is coupled, may be provided in the second outer frame 162 of the lower elastic member 160. In addition, a bent portion 162b, which guides a portion of the outer surface of each of the protrusions 147a and 147b of the housing 140 and which contacts a portion of the outer surface of each of the protrusions 147a and 147b, may be provided in the second outer frame 162 of the lower elastic member 160. The bent portions 162b of the second outer frame 162 may be provided such that a first distal end 17b and a second distal end 17d of the second coil 170 can be easily wound around the protrusions 147a and 147b of the housing 140.

For example, the first coil 120 may be coupled to the second inner frames of two of the first to fourth lower springs 160-1 to 160-4 via a solder or a conductive adhesive member.

For example, the second coil 170 may be coupled to the outer frames of the other two of the first to fourth lower springs 160-1 to 160-4 via a solder or a conductive adhesive member.

Each of the upper elastic member 150 and the lower elastic member 160 may be realized as a leaf spring. However, the disclosure is not limited thereto. Each of the upper elastic member 150 and the lower elastic member 160 may be realized as a coil spring or a suspension wire.

Each of the first connection portion 153 and the second connection portion 163 may be formed so as to be bent or curved (or crooked) at least once in order to form a predetermined pattern. The upward and/or downward movement of the bobbin 110 in the first direction may be flexibly (or elastically) supported through the positional change and minute deformation of the first and second connection portions 153 and 163.

In order to prevent an oscillation phenomenon when the bobbin 110 is moved, a damper may be disposed between the first connection portion 153 of the upper elastic member 150 and the upper surface of the bobbin 110, e.g. the upper escape recess 112a. Alternatively, a damper (not shown) may be disposed between the second connection portion 163 of the lower elastic member 160 and the lower surface of the bobbin 110, e.g. the lower escape recess 112b.

In addition, for example, a damper may be coated on a coupling portion between the upper elastic member 150 and each of the bobbin 110 and the housing 140 or on a coupling portion between the lower elastic member 160 and each of the bobbin 110 and the housing 140. For example, the damper may be gel-type silicon.

For example, the first to fourth lower springs 160-1 to 160-4 may be separated or spaced apart from each other at the first edges 141 of the housing 140.

A portion or one end of the second coil 170 may be connected to the first lower spring 160-1, and another portion or the other end of the second coil 170 may be connected to the second lower spring 160-2. In addition, a portion or one end of the first coil 120 may be connected to the third lower spring 160-3, and another portion or the other end of the first coil 120 may be connected to the fourth lower spring 160-4.

A first bonding portion 18a, to which the second portion 17b of the second coil 170 is coupled, may be provided at the second outer frame 162 of the first lower spring 160-1, and a second bonding portion 18b, to which the fourth portion 17d of the second coil 170 is coupled, may be provided at the second outer frame 162 of the second lower spring 160-2.

The reason that each of the first bonding portion 18a and the second bonding portion 18h is provided at the second outer frame 162 is that the second outer frame 162 is closer to the outer surface of the first edge 141 of the housing 140 than the second inner frame 161, whereby the first and second lower springs 160-1 and 160-2 can be more easily bonded to the second coil 170.

In addition, a third bonding portion 19a, to which a portion or one end of the first coil 120 is coupled, may be provided at the second inner frame 161 of the third lower spring 160-3, and a fourth bonding portion 19b, to which another portion or the other end of the first coil 120 is coupled, may be provided at the second inner frame 161 of the fourth lower spring 160-4.

The reason that each of the third bonding portion 19*a* and the fourth bonding portion 19*b* is provided at the second inner frame 161 is that second inner frame 161 is closer to the bobbin 110 than the second outer frame 162, whereby the third and fourth lower springs 160-3 and 160-4 can be more easily bonded to the first coil 120.

The first coil 120 is connected to the third and fourth bonding portions 19*a* and 19*b* provided at the second inner frames 161 of the third and fourth lower springs 160-3 and 160-4, and the second coil 170 is connected to the first and second bonding portions 18*a* and 18*b* provided at the second outer frames 162 of the first and second lower springs 160-1 and 160-2. In this embodiment, therefore, it is possible to reduce the distance between two points for bonding, whereby it is possible to more easily perform bonding.

For example, the third bonding portion 19*a* and the fourth bonding portion 19*b* may be provided at one ends of the second inner frames of the third and fourth lower springs (for example, 160-3 and 160-4), which face each other in the second direction or in the third direction. However, the disclosure is not limited thereto.

For example, the first bonding portion 18*a* and the second bonding portion 18*b* may be located adjacent to the bent portions 162*b* of the second outer frames 162 of the first lower spring 160-1 and the second lower spring 160-2, and may contact the bent portions 162*b*. However, the disclosure is not limited thereto.

In the case of the above first to fourth bonding portions 18*a*, 18*b*, 19*a*, and 19*b*, the "bonding portions" may also be referred to as pad portions, connection terminal portions, solder portions, or electrode portions.

The first to fourth lower springs 160-1 to 160-4 may include connection terminals 164-1 to 164-4, which are connected to the outer surfaces of the second outer frames 162 and which are bent and extend from respective second outer frames 162 toward the base 210.

The connection terminals 164-1 to 164-4 of the first to fourth lower springs 160-1 to 160-4 may be bent from the second outer frames 162 toward the base 210, and may be disposed so as to be spaced apart from each other.

Each of the connection terminals 164-1 to 164-4 of the first to fourth lower springs 160-1 to 160-4 may be disposed in, settled in, or inserted into a corresponding one of concave portions 205*a* to 205*d* provided in the base 210.

For example, the first and second connection terminals 164-1 and 164-2 of the first and second lower springs 160-1 and 160-2 may be disposed at a first outer surface of the base 210, and may abut the first outer surface.

The third and fourth connection terminals 164-3 and 164-4 of the third and fourth lower springs 160-3 and 160-4 may be disposed at a second outer surface of the base 210, and may abut the second outer surface. For example, the first outer surface and the second outer surface of the base 210 may face each other or may be opposite each other.

The first to fourth connection terminals 164-1 to 164-4 of the first to fourth lower springs 160-1 to 160-4 may be exposed from the base 210, and the first to fourth connection terminals 164-1 to 164-4 may be electrically separated from each other.

For example, the inner surface of each of the first to fourth connection terminals 164-1 to 164-4, which are disposed in the concave portions 205*a* to 205*d*, may abut one surface (e.g. the bottom surface) of a corresponding one of the concave portions 205*a* to 205*d*.

The outer surface of each of the first to fourth connection terminals 164-1 to 164-4, which are disposed in the concave portions 205*a* to 205*d*, may be exposed from the outer surface of the base 210, and the lower end of each of the first to fourth connection terminals 164-1 to 164-4 may be exposed from the lower surface of the base 210.

The depth of each of the concave portions 205*a* to 205*d* may be greater than the thickness of a corresponding one of the first to fourth connection terminals 164-1 to 164-4, and the outer surface of each of the first to fourth connection terminals 164-1 to 164-4, which are disposed in the concave portions 205*a* to 205*d*, may not protrude out of a corresponding one of the concave portions 205*a* to 205*d*.

Each of the first to fourth connection terminals 164-1 to 164-4 may be made of a conductive material for the supply of electric power or a signal from the outside, and may be connected to external wires or external elements by soldering.

If solder bonded to the first to fourth connection terminals 164-1 to 164-4 protrudes out of the outer surface of the base 210, the solder bonded to the first to fourth connection terminals 164-1 to 164-4 may contact or collide with the cover member 300, whereby an electric short circuit or open circuit may occur. In this embodiment, sufficient depth of the concave portions 205*a* to 205*d* is secured such that the solder bonded to the first to fourth connection terminals 164-1 to 164-4 does not protrude out of the outer surface of the base 210, whereby it is possible to prevent an electric short circuit or open circuit.

If the first and second coils 120 and 170 are directly bonded to the connection terminals 164-1 to 164-4 by first solder, the first solder may melt when soldering is performed on the first to fourth connection terminals 164-1 to 164-4 for connection with the outside, whereby connection of the first and second coils 120 and 170 may be interrupted.

In this embodiment, the first to fourth bonding portions 18*a*, 18*b*, 19*a*, and 19*b*, to which the first coil 120 and the second coil 170 are bonded, are provided at the lower elastic member 160 separately from the first to fourth connection terminals 164-1 to 164-4. When soldering is performed on the first to fourth connection terminals 164-1 to 164-4, therefore, it is possible to prevent the interruption of connection between the first and second coils 120 and 170 and the first to fourth lower springs 160-1 to 160-4.

In the case of the above connection terminals 164-1 to 164-4, the "connection terminals" may also be referred to as pad portions, bonding portions, solder portions, or electrode portions.

An induction voltage of the second coil 170 may be output to the outside through the first and second connection terminals 164-1 and 164-2 of the first and second lower springs 160-1 and 160-2, and a driving signal for driving the first coil 120 may be provided to the third and fourth connection terminals 164-3 and 164-4 of the third and fourth lower springs 160-3 and 160-4.

In the above embodiment, the first to fourth connection terminals 164-1 to 164-4 are integrally formed with the second outer frames, and are bent from the second outer frames. However, the disclosure is not limited thereto.

In another embodiment, the connection terminals for connection with external terminals may not be integrally formed with the second outer frames of the first to fourth lower springs, may be provided separately from the lower elastic member, may be disposed in the concave portion 205*a* to 205*d*, and may be coupled to the second outer frames of the first to fourth lower springs via a solder or a conductive adhesive member.

In the embodiment of FIG. 2, the terminals 164-1 to 164-4 for connection with the outside are provided at the lower elastic member 160. In another embodiment, however, the terminals 164-1 to 164-4 may be omitted, and a board including terminals for connection with the outside (e.g. a circuit board) may be provided. At this time, the circuit board may include terminals connected to the first to fourth lower springs 160-1 to 160-4, and may be disposed in the housing 140 or the base 210.

Next, the second coil 170 will be described.

The second coil 170 is disposed on the outer surface of the housing 140. For example, the second coil 170 may be disposed in the first recess 14, or may be directly wound in the first recess 14. A portion of the second coil 170 may be wound around the first protrusion 147a of the housing 140, and another portion of the second coil 170 may be wound around the second protrusion 147b of the housing 140. For example, the second coil 170 may have a closed-loop shape that is disposed on the outer surface of the housing 140.

The second coil 170 may not overlap the first coil 120 in a direction parallel to the optical axis or in the first direction.

A first portion 17a of the second coil 170 may not overlap the magnet 130 in a direction parallel to the optical axis (or the first direction) and in a direction perpendicular to the optical axis. The reason for this is that it is necessary to reduce interference between the magnet 130 and the second coil 170. In another embodiment, the first portion 17a of the second coil 170 may overlap the magnet 130 in a direction parallel to the optical axis (or the first direction).

In addition, at the initial position of the bobbin 110, the first portion 17a of the second coil 170 may be located so as to be spaced apart from the first coil 120 by a predetermined distance in the first direction, and may not overlap the first coil 120 in a direction perpendicular to the first direction.

For example, at the initial position of the bobbin 110, the second coil 170 may be located above the first coil 120 based on the lower surface of the bobbin 110.

The reason that the predetermined distance between the first coil 120 and the second coil 170 in the first direction is maintained is that it is necessary to secure the linearity of the induction voltage that is induced in the second coil 170 by a driving signal, e.g. a driving current, applied to the first coil 120.

The second coil 170 may overlap the magnet 130 in the first direction. However, the disclosure is not limited thereto. In another embodiment, said elements may not overlap each other in the first direction.

The second coil 170 may not overlap the first connection portion 153 of the upper elastic member 150 or the second connection portion 163 of the lower elastic member 160 in the first direction, and may be located at the outside based on the first and second connection portions 153 and 163. Here, the outside may be the side opposite the central direction of the housing 140 based on the first and second connection portions. As a result, for a given number of windings, it is possible to increase the length of the second coil 170.

An induction voltage is generated in the second coil 170 due to mutual induction with the first coil 120, to which a driving signal (e.g. a driving current) is applied.

The first coil may be moved together with the bobbin 110 in the first direction by electromagnetic force generated by electromagnetic interaction between current flowing in the first coil 120 according to the driving signal and the magnet 130.

As the first coil 120 is moved in the first direction, the distance between the first coil 120 and the second coil 170 may be changed, and as the distance is changed, an induction voltage may be generated in the second coil 170.

For example, as the distance between the first coil 120 and the second coil 170 decreases, the induction voltage generated in the second coil 170 may increase, and as the distance between the first coil 120 and the second coil 170 increases, the induction voltage generated in the second coil 170 may decrease.

The displacement of the first coil 120 and the bobbin 110 may be sensed based on the voltage induced in the second coil 170, and the displacement of the bobbin 110 or the driving signal that is provided to the first coil 120 may be feedback-controlled based on the sensed displacement of the bobbin 110.

Figure 11:
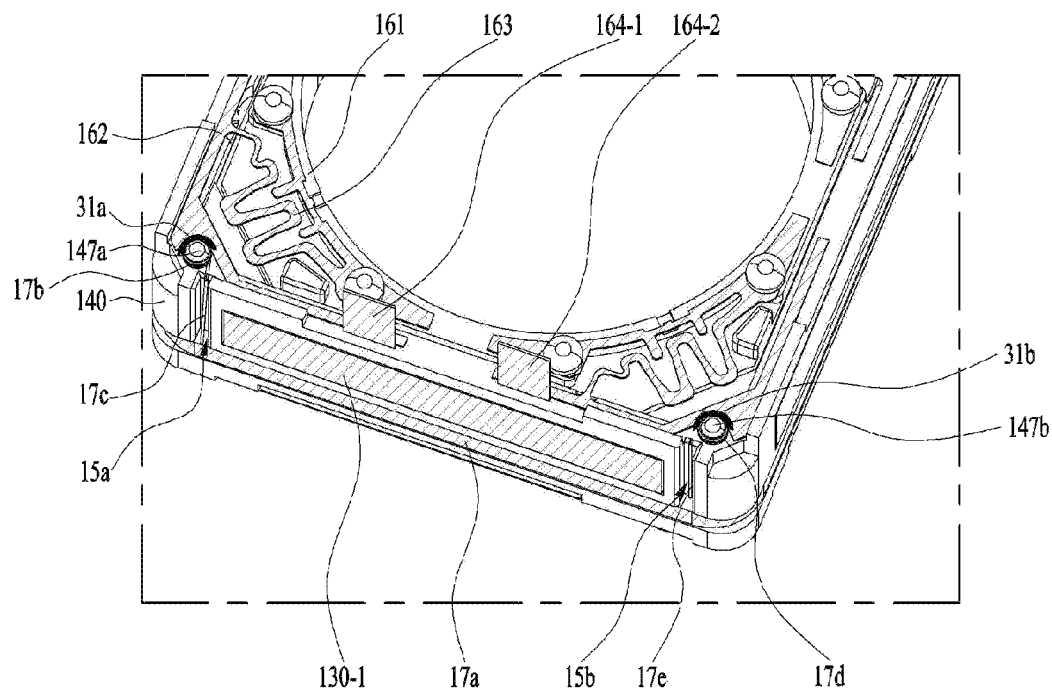
FIG. 11 is a view showing an embodiment of coupling between a second coil and a first lower spring and coupling between the second coil and a second lower spring.

FIG. 11 is a view showing an embodiment of coupling between the second coil 170 and the first lower spring 160-1 and coupling between the second coil 170 and the second lower spring 160-2.

Referring to FIG. 11, the portion of the second coil 170 that is disposed in the housing 140 is wound around the first protrusion 147a of the housing 140 at least once, and another portion of the second coil 170 is wound around the second protrusion 147b of the housing 140 at least once.

The reason that a portion of the second coil 170 is wound around the first protrusion and another portion of the second coil 170 is wound around the second protrusion 147b is that it is possible to solder a portion of the second coil 170 to the second outer frame of the first lower spring 160-1 and to solder another portion of the second coil 170 to the second outer frame of the second lower spring 160-2 without separate wire arrangement. Another reason is that, at the time of soldering, it is possible to stably and securely fix a portion and another portion of the second coil 170 to the first and second protrusions 147a and 147b of the housing 140, thereby preventing movement or shaking of the second coil 170 and thus improving solderability.

For example, the second coil 170 may include a first portion 17a disposed at the side surface (or the outer surface), e.g. the first recess 14, of the housing 140, a second portion 17b wound around the first protrusion 147a of the housing 140, a third portion 17c connecting one end of the first portion 17a and the second portion 17b to each other, a fourth portion 17d wound around the second protrusion 147b of the housing 140, and a fifth portion 17e connecting the other end of the first portion 17a and the fourth portion 17d to each other.

The first portion 17a may be referred to as a "main body" of the coil 170, the second portion 17b may be referred to as a "first wound member," the third portion 17c may be referred to as a "first connection line," the fourth portion 17d may be referred to as a "second wound member," and the fifth portion 17e may be referred to as a "second connection line."

For example, the first portion 17a of the second coil 170 may have a closed-loop, coil-ring, or ring shape disposed so as to wrap the outer surface of the housing 140.

The first protrusion 147a may be disposed on the lower surface of the first corner portion of the housing 140, the second protrusion 147b may be disposed on the lower surface of the second corner portion of the housing 140, and the first corner portion and the second corner portion may be located at opposite sides of one edge of the housing 140.

The second recess 15a may be disposed in the outer surface of the first corner portion of the housing 140, and the third recess 15b may be disposed in the outer surface of the second corner portion of the housing 140.

For example, the second recess 15a of the housing 140 may be disposed in one side of the recess 141a provided in the housing 140 for disposition of the magnet 130-1, and the third recess 15b may be disposed in the other side of the recess 141a.

The third portion 17c of the second coil 170 may be disposed in the second recess 15a, and the fifth portion 17e of the second coil 170 may be disposed in the third recess 15b.

The third portion 17c of the second coil 170 may be disposed at one side of the magnet 130-1 disposed in one of the first edges of the housing 140, and the fifth portion 17e of the second coil 170 may be disposed at the other side of the magnet 130-1.

For example, the third portion 17c of the second coil 170 may be disposed at the first corner portion, among the corner portions of the housing 140, and the fifth portion 17e of the second coil 170 may be disposed at the second corner portion, which is adjacent to the first corner portion.

In order to prevent the third portion 17c and the fifth portion 17e of the second coil 170 from deviating from the outer surface of the edge of the housing 140, the depth of each of the second recess 15a and the third recess 15b may be greater than the thickness of a strand of the second coil 170.

Each of the second recess 15a and the third recess 15b may be connected to the first recess 14, and may extend from the first recess 14 to the lower end of the housing 140.

For example, for stable fixing, the number of turns that the second portion 17b of the second coil 170 is wound around the first protrusion 147a and the number of turns that the fourth portion 17d of the second coil 170 is wound around the second protrusion 147b may be 3 to 10. However, the disclosure is not limited thereto.

The bent portion 162b provided at the second outer fame 162 of the first lower spring 160-1 may be disposed at the lower surface of the first corner portion, and the bent portion 162b provided at the second outer frame 162 of the second lower spring 160-2 may be disposed at the lower surface of the second corner portion.

The second coil 170 may include a conductive wire and a cladding member (e.g. an insulation portion) for wrapping the conductive wire, and the conductive wire of the second portion 17b and the fourth portion 17d of the second coil 170 may be exposed from the cladding member. The reason for this is that it is necessary to connect the second coil 170 to the first and second lower springs 160-1 and 160-2 by soldering.

As shown in FIG. 11, the lens moving apparatus 100 according to the embodiment may further include a first solder portion 31a, disposed on the first bonding portion 18a of the first lower spring 160-1 and on the second portion 17b of the second coil 170, and a second solder portion 31b, disposed on the second bonding portion 18b of the second lower spring 160-12 and on the fourth portion 17d of the second coil 170.

The first solder portion 31a may contact the bent portion 162b of the first lower spring 160-1 and the second portion 17b of the second coil 170.

For example, the first solder portion 31a may contact the portion at which the bent portion 162b of the second outer frame 162 of the first lower spring 160-1 contacts the first protrusion 147a of the housing 140.

The second solder portion 31b may contact the bent portion 162b of the second outer frame 162 of the second lower spring 160-2 and the fourth portion 17d of the second coil 170.

For example, the second solder portion 31b may contact the portion at which the bent portion 162b of the second outer frame 162 of the second lower spring 160-2 contacts the second protrusion 147b of the housing 140.

In another embodiment, the first solder portion 31a may cover the first protrusion 147a and the entirety of the second portion 17b of the second coil 170, and the second solder portion 31b may cover the second protrusion 147ab of the housing 140 and the entirety of the fourth portion 17d of the second coil 170.

In this embodiment, no separate circuit board is used to provide a driving signal to the first coil 120 or to transfer the induction voltage of the second coil 170 to the outside. The driving signal may be directly provided to the first coil 120, and the induction voltage induced in the second coil 170 may be transferred to the outside through the first to fourth connection terminals 164-1 to 164-4 of the first to fourth lower springs 160-1 to 160-4, whereby manufacturing costs may be reduced.

In addition, since opposite ends of the second coil 170 are wound around the first and second protrusions 147a and 147b of the housing 140, in this embodiment, the soldering process may be directly performed without separate wire arrangement at the time of soldering between the second coil 170 and the first and second lower springs 160-1 and 160-2.

In another embodiment, the second coil 170 may include a first portion 17a disposed at the side surface of the housing 140, a second portion 17b wound around the first protrusion 147a and connected to the first lower spring 160-1, a third portion 17d wound around the second protrusion 147b and connected to the second lower spring 160-2, a first connection line (or a first connection portion) 17c connecting one end of the first portion 17a and the second portion 17b to each other, and a second connection line (or a second connection portion) 17e connecting the other end of the first portion 17a and the third portion 17d to each other.

Figure 12:
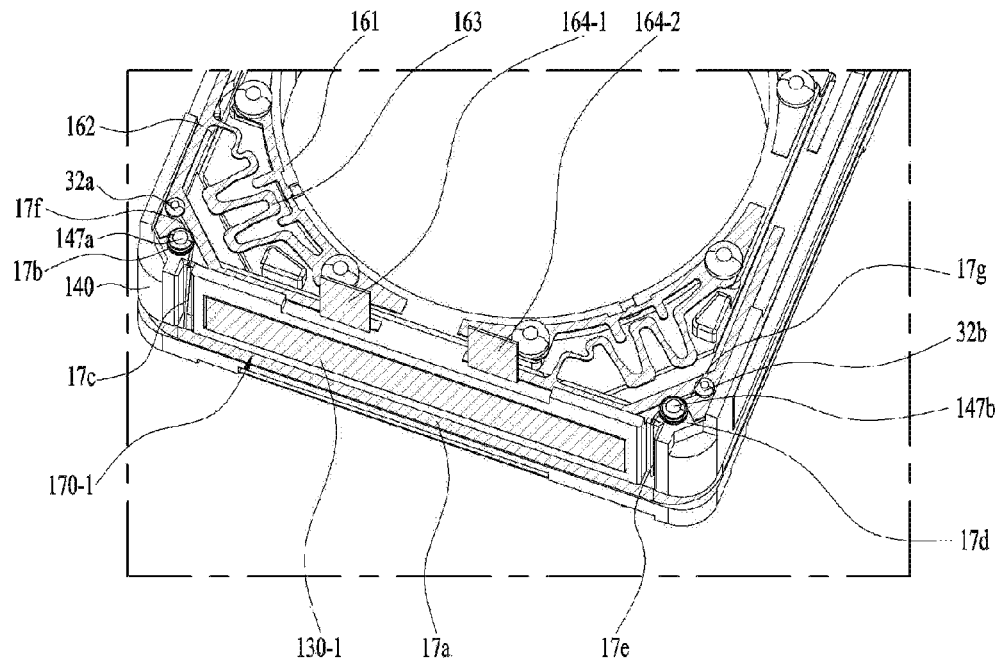
FIG. 12 is a view showing another embodiment of coupling between the second coil and the first lower spring and coupling between the second coil and the second lower spring.

FIG. 12 is a view showing another embodiment of coupling between a second coil 170-1 and the first lower spring 160-1 and coupling between the second coil 170-1 and the second lower spring 160-2.

Referring to FIG. 12, a portion of the second coil 170-1 disposed in the housing 140 may include a first extension line 17f wound around the first protrusion 147a of the housing 140 at least once and extending to the first bonding portion 18a of the second outer frame 162 of the first lower spring 160-1.

A first solder portion 32a may be disposed on the first extension line 17f and on the first bonding portion 18a. The first extension line 17f and the first bonding portion 18a of the second outer frame 162 of the first lower spring 160-1 may be connected to each other by the first solder portion 32a.

In addition, another portion of the second coil 170-1 disposed in the housing 140 may include a second extension line 17g wound around the second protrusion 147b of the housing 140 at least once and extending to the second bonding portion 18b of the second outer frame 162 of the second lower spring 160-2.

A second solder portion 32b may be disposed on the second extension line 17g and on the second bonding portion 18b. The second extension line 17g and the second bonding portion 18b of the second outer frame 162 of the second lower spring 160-2 may be connected to each other by the second solder portion 32b.

For example, the first solder portion 32a may be spaced apart from the second portion 17b of the second coil 170-1, and the second solder portion 32b may be spaced apart from the fourth portion 17d of the second coil 170-1. As a result, the length of the second coil 170-1 may be further increased.

The second coil 170-1 may include a conductive wire and a cladding member (e.g. an insulation portion) for wrapping the conductive wire, and the conductive wire of the first extension line 17f and the second extension line 17g of the second coil 170-1 may be exposed from the cladding member. The reason for this is that it is necessary to connect the second coil 170-1 to the first and second lower springs 160-1 and 160-2 by soldering.

For example, the second coil 170-1 may include a first portion 17a disposed in the first recess 14 of the housing 140, a second portion 17b wound around the first protrusion 147a of the housing 140, a third portion 17c connecting one end of the first portion 17a and the second portion 17b to each other, a fourth portion 17d wound around the second protrusion 147b of the housing 140, a fifth portion 17e connecting the other end of the first portion 17a and the fourth portion 17d to each other, a sixth portion extending from one end of the second portion 17b, and a seventh portion extending from one end of the fourth portion 17d.

For example, the sixth portion of the second coil 170-1 may be the first extension line 17f, and the seventh portion of the second coil 170-1 may be the first extension line 17g.

In another embodiment, the second coil 170-1 may include a first portion 17a disposed at the side surface of the housing 140, a second portion 17b wound around the first protrusion 147a of the housing 140 and connected to the first lower spring 160-1, a third portion 17d wound around the second protrusion 147b and connected to the second lower spring 160-2, a first connection line (or a first connection portion) 17c connecting one end of the first portion 17a and the second portion 17b to each other, a second connection line (or a second connection portion) 17e connecting the other end of the first portion 17a and the third portion 17d to each other, a first extension line 17f extending from one end of the second portion 17b, and a second extension line 17g extending from one end of the third portion 17d.

The first portion 17a, which is the main body of the second coil 170 or 170-1 shown in FIGS. 11 and 12, may be a portion that generates an induction voltage through interaction with the first coil 120.

The second to fifth portions 17b to 17e of the second coil 170 or the second to seventh portions 17b to 17g of the second coil 170-1 may be portions extending from the first portion 17a, which is the main body of the second coil 170 or 170-1.

Since the second coil 170 or 170-1, disposed in the housing 140, extends to the first and second bonding portions 18a and 18b of the first and second lower springs 160-1 and 160-2, the length of the second coil 170 or 170-1 may be increased. As the length of the second coil 170 or 170-1 is increased, the resistance of the second coil 170 or 170-1 may also increase. As a result, the magnitude of the induction voltage induced in the second coil 170 or 170-1 may increase, whereby it is possible to improve sensitivity in detecting the position of the bobbin 110 for AF feedback driving.

The base may be disposed under the lower elastic member 160, and may define a receiving space for receiving the bobbin 110 and the housing 140 together with the cover member 300. The base 210 may have an opening corresponding to the opening in the bobbin 110 and/or the opening in the housing 140, and may have a shape coinciding with or corresponding to the shape of the cover member 300, for example, a quadrangular shape.

The base 210 may include a guide member 216 (see FIG. 10) protruding upwards from each of the four corners thereof by a predetermined height. The guide member 216 may have a polygonal prismatic shape protruding from the upper surface of the base 210 so as to be perpendicular to the upper surface of the base 210. However, the disclosure is not limited thereto.

The concave portions 205a to 205d may be provided in the outer surface of the base 210. For example, the concave portions 205a to 205d of the base 210 may be provided in the outer surfaces of facing edges of the base 210 so as to be spaced apart from each other.

For example, in another embodiment, the concave portions 205a to 205d may be provided in the outer surfaces of two first edges of the base 210 that do not face each other depending on the positions at which the first to fourth connection terminals 164-1 to 164-4 are disposed.

For example, each of the concave portions 205a to 205d may include an upper opening formed toward the upper surface of the base 210 and a lower opening formed toward the lower surface of the base 210.

A protrusion 21 for guiding the inner frames of the lower springs may be provided on the upper surface of the base 210. The protrusion 21 may be disposed around the opening in the base 210, and may include a plurality of portions that are spaced apart from each other.

Meanwhile, the lens moving apparatus according to the above embodiment may be used in various fields, such as those of a camera module or an optical instrument.

For example, the lens moving apparatus 100 according to the embodiment may be included in an optical instrument configured to form an image of an object in a space using reflection, refraction, absorption, interference, diffraction, etc., which are characteristics of light, to increase the visual power of the eyes, to record or reproduce an image formed by a lens, to perform optical measurement, or to propagate or transfer an image. For example, an optical instrument according to an embodiment may include a smartphone or a portable terminal equipped with a camera.

Figure 13:
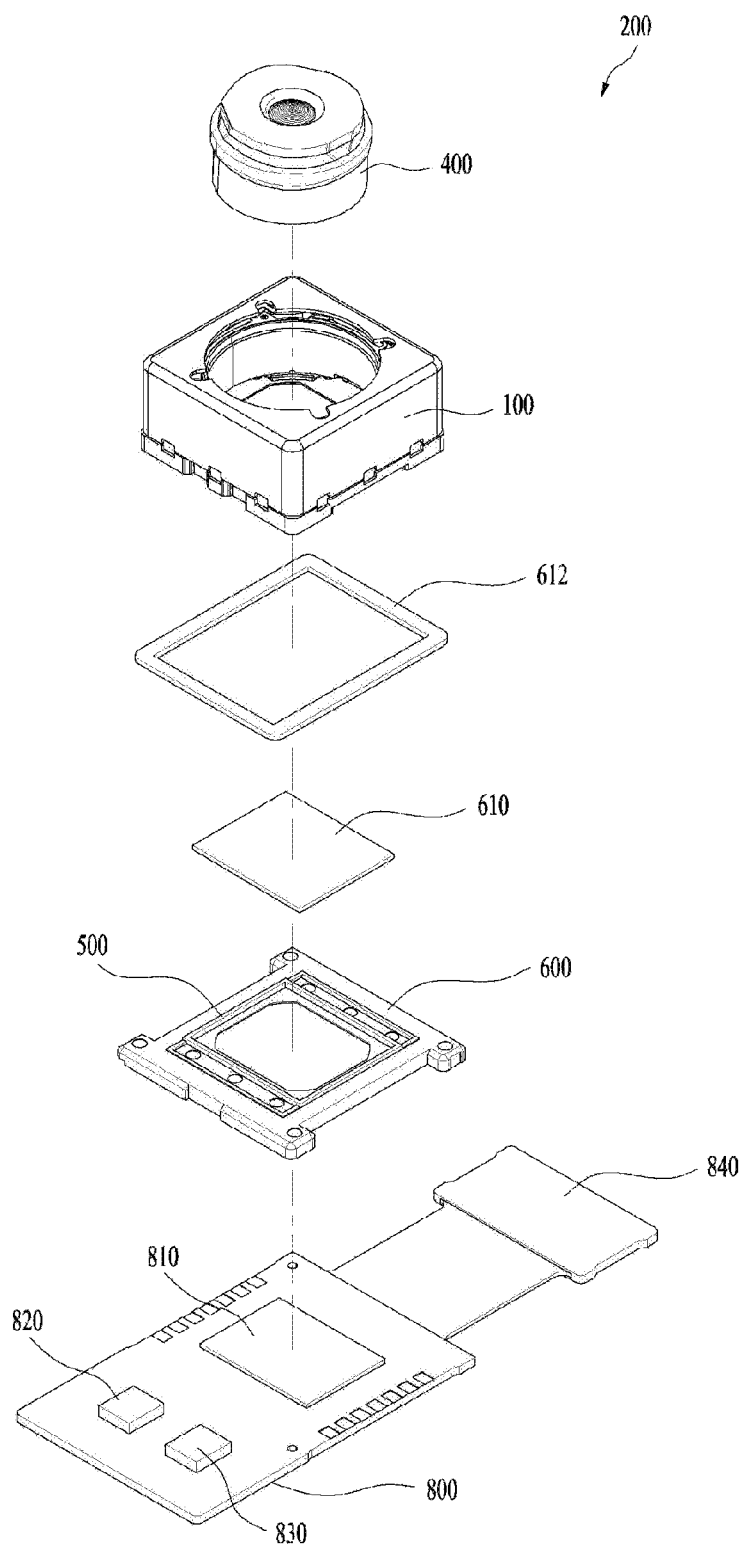
FIG. 13 is an exploded perspective view showing a camera module according to an embodiment.

FIG. 13 is an exploded perspective view showing a camera module 200 according to an embodiment.

Referring to FIG. 13, the camera module 200 may include a lens or a lens barrel 400, a lens moving apparatus 100, an adhesive member 612, a filter 610, a first holder 600, a second holder 800, an image sensor 810, a motion sensor 820, a controller 830, and a connector 840.

The lens or the lens barrel 400 may be mounted in the bobbin 110 of the lens moving apparatus 100.

The first holder 600 may be disposed under the base 210 of the lens moving apparatus 100. The filter 610 may be mounted to the first holder 600, and the first holder 600 may be provided with a protrusion, on which the filter 610 is settled.

The adhesive member 612 may couple or adhere the base 210 of the lens moving apparatus 100 to the first holder 600. The adhesive member 612 may function to prevent foreign matter from being introduced into the lens moving apparatus 100, in addition to the adhesive function.

For example, the adhesive member 612 may be epoxy, a thermohardening adhesive, or a UV-hardening adhesive.

The filter 610 may function to prevent a specific-frequency-band component of the light passing through the lens barrel 400 from being incident on the image sensor 810. The filter 610 may be an infrared cutoff filter. However, the disclosure is not limited thereto. At this time, the filter 610 may be disposed parallel to the x-y plane.

An opening, through which light passing through the filter 610 is incident on the image sensor 810, may be provided in the region of the first holder 600 on which the filter 610 is mounted.

The second holder 800 may be disposed under the first holder 600, and the image sensor 810 may be mounted on the second holder 600. The image sensor 810 is a region on which light passing through the filter 610 is incident in order to form an image including the light.

The second holder 800 may be provided with various circuits, elements, and a controller in order to convert an image formed on the image sensor into an electrical signal and transfer the electrical signal to an external apparatus.

The second holder 800 may be realized as a circuit board, on which the image sensor may be mounted, on which a circuit pattern may be formed, and on which various elements are coupled to each other. The first holder 600 may also be referred to as a "holder" or a "sensor base," and the second holder 800 may also be referred to as a "board" or a "circuit board."

The image sensor 810 may receive an image included in the light incident through the lens moving apparatus 100, and may convert the received image into an electrical signal.

The filter 610 and the image sensor 810 may be disposed so as to be spaced apart from each other in the state of being opposite each other in the first direction.

The motion sensor 820 may be mounted on the second holder 800, and may be connected to the controller 830 via the circuit pattern provided on the second holder 800.

The motion sensor 820 outputs information about rotational angular velocity based on the movement of the camera module 200. The motion sensor 820 may be realized as a two-axis or three-axis gyro sensor or an angular velocity sensor.

The controller 830 is mounted on the second holder 800. The second holder 800 may be connected to the lens moving apparatus 100. For example, the second holder 800 may be connected to the first coil 120 and the second coil 170 or 170-1 of the lens moving apparatus 100.

For example, the second holder 800 may include terminals connected to the first to fourth connection terminals 164-1 to 164-4 of the first to fourth lower springs 160-1 to 160-4.

For example, a driving signal may be provided to the first coil 120 through the second holder 800, and the induction voltage of the second coil 170 or 170-1 may be transferred to the second holder 800. For example, the induction voltage of the second coil 170 or 170-1 may be received by the controller 830.

For example, the controller 830 may sense the displacement of the bobbin 110 using the received induction voltage of the second coil 170 or 170-1, and may perform AF feedback driving using the sensed displacement of the bobbin 110.

The connector 840 may be connected to the second holder 800, and may have a port for connection with an external apparatus.

Figure 14:
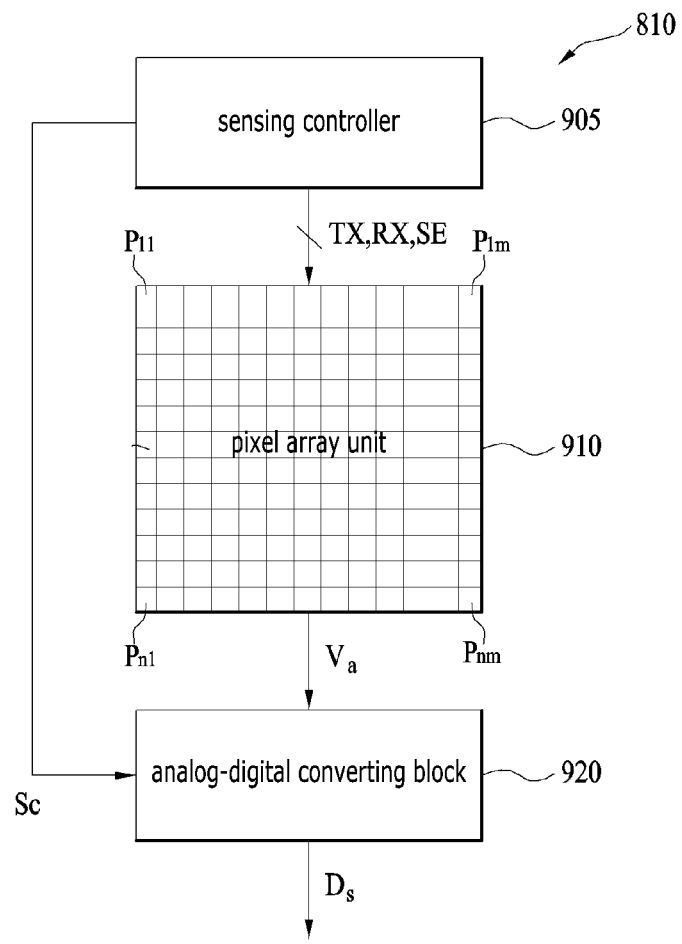
FIG. 14 is a block diagram showing an embodiment of the image sensor shown in FIG. 13.

FIG. 14 is a block diagram showing an embodiment of the image sensor 810 shown in FIG. 13.

Referring to FIG. 14, the image sensor 810 includes a sensing controller 905, a pixel array 910, and an analog-digital converting block 920.

The sensing controller 905 outputs control (e.g. a reset signal RX, a transfer signal TX, and a selection signal SE for controlling transistors included in the pixel array 910 and control signals Sc for controlling the analog-digital converting block 920.

The pixel array 910 may include a plurality of unit pixels P11 to Pnm (n and m being natural numbers greater than 1), and the unit pixels P11 to Pnm may be arranged so as to have a matrix shape including rows and columns. Each of the unit pixels P11 to Pnm may be a photoelectric transformation element for sensing light and converting the sensed light into an electrical signal.

The pixel array 910 may include sensing lines connected to output ends of the unit pixels P11 to Pnm.

For example, each of the unit pixels P11 to Pnm may include a photodiode, a transfer transistor, a reset transistor, a drive transistor, and a select transistor. However, the disclosure is not limited thereto. The number of transistors included in each unit pixel is not limited to 5, but may be 3 or 5.

The photodiode may absorb light and generate an electric charge using the absorbed light.

The transfer transistor may transfer the electric charge, generated by the photodiode, to a sensing node (e.g. a floating diffusion region) in response to the transfer signal TX. The reset transistor may reset the unit pixels in response to the reset signal RX. The drive transistor may be controlled in response to the voltage of the sensing node, may be realized as a source follower, and may function as a buffer. The select transistor may be controlled by the selection signal SE, and may output sensing signals Va to output terminals of the unit pixels.

The analog-digital converting block 920 samples the sensing signals Va, which are analog signals output from the pixel array 910, and converts a sampled sensing signal into a digital signal Ds. The analog-digital converting block 920 may perform correlated double sampling (CDS) in order to remove the inherent fixed-pattern noise of each pixel.

The sensing controller 905 and the analog-digital converting block 920 may be realized separately from the controller 830. However, the disclosure is not limited thereto. The sensing controller 905, the analog-digital converting block 920, and the controller 830 may be realized as a single controller.

Figure 15:
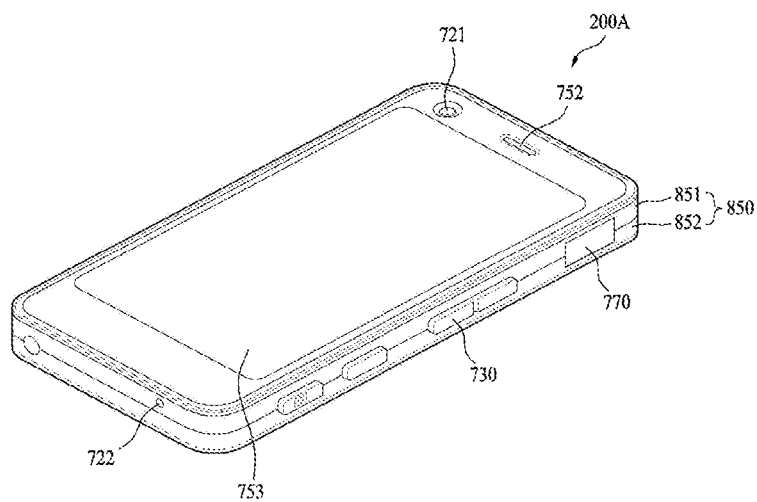
FIG. 15 is a perspective view showing a portable terminal according to an embodiment.
Figure 16:
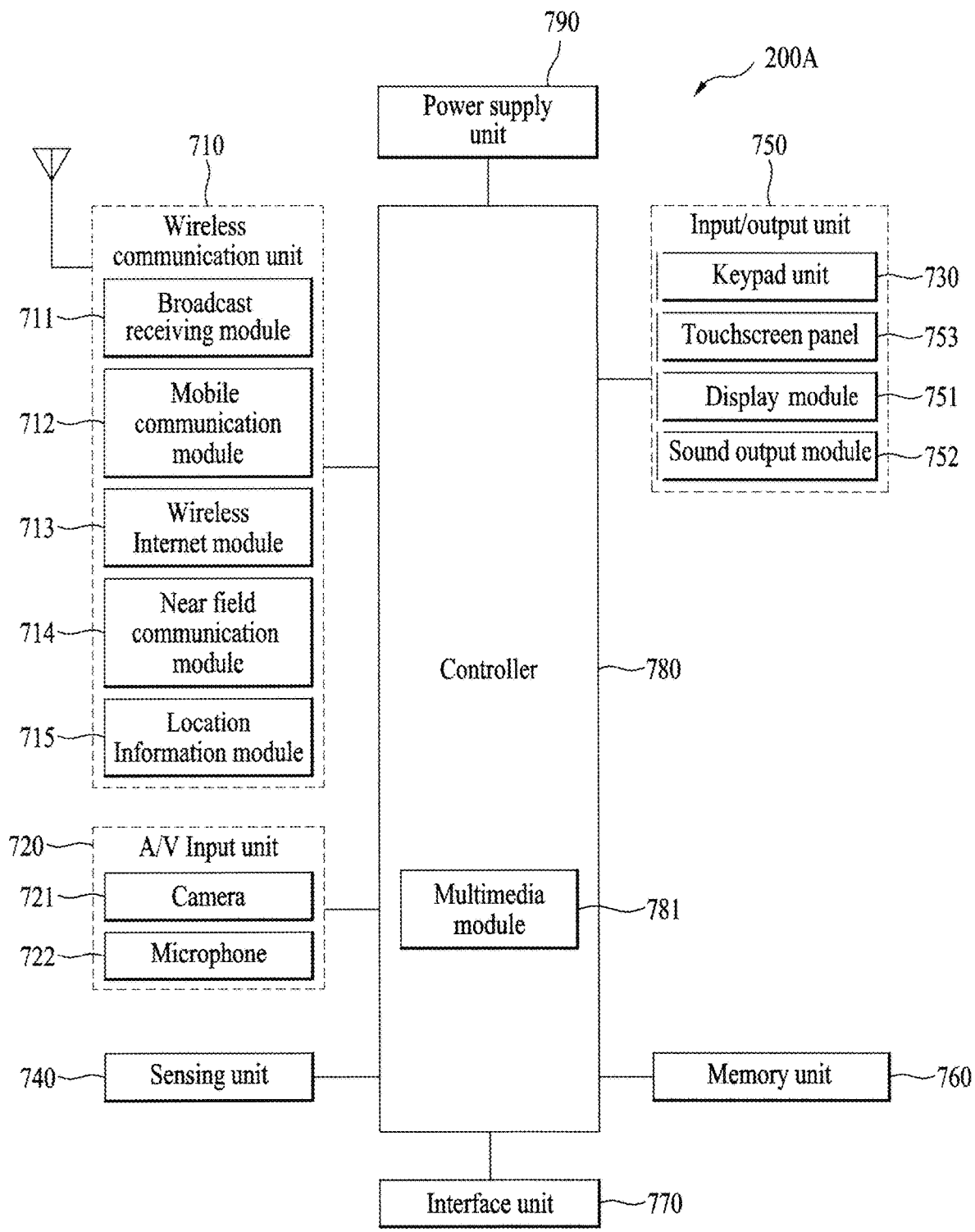
FIG. 16 is a view showing the construction of the portable terminal shown in FIG. 15.

FIG. 15 is a perspective view showing a portable terminal 200A according to an embodiment, and FIG. 16 is a view showing the construction of the portable terminal 200A shown in FIG. 15.

Referring to FIGS. 15 and 16, the portable terminal 200A (hereinafter, referred to as a "terminal") may include a body 850, a wireless communication unit 710, an A/V input unit 720, a sensing unit 740, an input/output unit 750, a memory unit 760, an interface unit 770, a controller 780, and a power supply unit 790.

The body 850 shown in FIG. 15 has a bar shape. However, the disclosure is not limited thereto. The body may have any of various structures, such as a slide type structure, a folder type structure, a swing type structure, and a swivel type structure, in which two or more sub-bodies are coupled so as to be movable relative to each other.

The body 850 may include a case (casing, housing, cover, etc.) that defines the external appearance thereof. For example, the body 850 may be divided into a front case 851 and a rear case 852. Various electronic parts of the terminal may be mounted in the space defined between the front case 851 and the rear case 852.

The wireless communication unit 710 may include one or more modules that enable wireless communication between the terminal 200A and a wireless communication system or between the terminal 200A and a network in which the terminal 200A is located. For example, the wireless communication unit 710 may include a broadcast receiving module 711, a mobile communication module 712, a wireless Internet module 713, a nearfield communication module 714, and a position information module 715.

The A/V (audio/video) input unit 720, which is provided to input an audio signal or a video signal, may include a camera 721 and a microphone 722.

The camera 721 may include a camera module 200 according to the embodiment shown in FIG. 13.

The sensing unit 740 may sense the current state of the terminal 200A, such as the opening and closing state of the terminal 200A, the position of the terminal 200A, whether a user contacts the terminal, the orientation of the terminal 200A, and acceleration/deceleration of the terminal 200A, in order to generate a sensing signal for controlling the operation of the terminal 200A. For example, in the case in which the terminal 200A is a slide phone, the sensing unit may sense whether the slide phone is open or closed. In addition, the sensing unit senses whether power is supplied from the power supply unit 790 and whether the interface unit 770 is coupled to an external instrument.

The input/output unit 750 is provided to generate input or output related to visual sensation, auditory sensation, or tactile sensation. The input/output unit 750 may generate input data for controlling the operation of the terminal 200A, and may display information processed by the terminal 200A.

The input/output unit 750 may include a keypad unit 730, a display module 751, a sound output module 752, and a touchscreen panel 753. The keypad may generate input data through a keypad input.

The display module 751 may include a plurality of pixels, the color of which is changed according to an electrical signal. For example, the display module 751 may include at least one of a liquid crystal display, a thin film transistor-liquid crystal display, an organic light-emitting diode, a flexible display, or a 3D display.

The sound output module 752 may output audio data received from the wireless communication unit 710 in a call signal reception mode, a telephone communication mode, a recording mode, a voice recognition mode, or a broadcast reception mode, or may output audio data stored in the memory unit 760.

The touchscreen panel 753 may convert the change of capacitance due to a user's touch on a specific region of the touchscreen into an electrical input signal.

The memory unit 760 may store a program for processing and control of the controller 780, and may temporarily store input/output data (for example, a telephone directory, messages, audio, still images, photographs, and video). For example, the memory unit 760 may store images, such as photographs or video, captured by the camera 721.

The interface unit 770 functions as a path for connection between the terminal 200A and an external instrument. The interface unit 770 may receive data from the external instrument, may receive electric power and transmit the received electric power to internal components of the terminal 200A, or may transfer data in the terminal 200A to the external instrument. For example, the interface unit 770 may include a wired/wireless headset port, an external charger port, a wired/wireless data port, a memory card port, a port for connection with an apparatus having an identification module, an audio input/output (I/O) port, a video input/output (I/O) port, and an earphone port.

The controller 780 may control the overall operation of the terminal 200A. For example, the controller 780 may perform related control and processing for voice communication, data communication, and video communication.

The controller 780 may have a multimedia module 781 for multimedia reproduction. The multimedia module 781 may be realized in the controller 780, or may be realized separately from the controller 780.

The controller 780 may receive the induction voltage of the second coil 170 or 170-1 from the camera module, may receive information about the displacement of the bobbin 110 acquired by the camera module based on the induction voltage of the second coil 170 or 170-1, and may perform AF feedback driving based on the received induction voltage or the information about the displacement of the bobbin 110.

The controller 780 may perform pattern recognition processing that is capable of recognizing writing input or drawing input performed on the touchscreen as text or an image, respectively.

The power supply unit 790 may receive external power and internal power and supply required power to respective components under the control of the controller 780.

The features, structures, and effects described in the above embodiments are included in at least one embodiment, but are not limited only to one embodiment. Furthermore, features, structures, and effects illustrated in each embodiment may be combined or modified in other embodiments by those skilled in the art to which the embodiments pertain. Therefore, it is to be understood that such combinations and modifications fall within the scope of the present disclosure.

INDUSTRIAL APPLICABILITY

Embodiments may be used in a lens moving apparatus configured such that a soldering process is directly performed without separate wire arrangement for a second coil at the time of soldering between the second coil and lower springs and such that the movement or shaking of the second coil is prevented at the time of soldering, thereby improving solderability, and a camera module and an optical instrument including the same.

The invention claimed is:

1. A lens moving apparatus comprising:
   a housing comprising a first protrusion and a second protrusion at a lower portion thereof;
   a bobbin disposed in the housing;
   a first coil disposed in the bobbin;
   a magnet disposed in the housing, the magnet being disposed so as to correspond to the first coil;
   a second coil disposed on an outer surface of the housing;
   an upper elastic member coupled to an upper portion of the bobbin; and
   a lower elastic member coupled to a lower portion of the bobbin, wherein
   the lower elastic member comprises a first spring, a second spring, a third spring, and a fourth spring disposed so as to be spaced apart from each other,
   a portion of the second coil is wound around the first protrusion at least once and is connected to the first spring, and
   another portion of the second coil is wound around the second protrusion at least once and is connected to the second spring.

2. The lens moving apparatus according to claim 1, wherein
   a portion of the first coil is connected to the third spring, and
   another portion of the first coil is connected to the fourth spring.

3. The lens moving apparatus according to claim 2, wherein the lower elastic member comprises an inner frame coupled to the lower portion of the bobbin, an outer frame coupled to the housing, and a connection portion connecting the inner frame and the outer frame to each other.

4. The lens moving apparatus according to claim 3, wherein the second coil comprises:
   a first portion disposed on the outer surface of the housing;
   a second portion wound around the first protrusion;
   a third portion connecting one end of the first portion and one end of the second portion to each other;
   a fourth portion wound around the second protrusion; and
   a fifth portion connecting the other end of the first portion and one end of the fourth portion to each other.

5. The lens moving apparatus according to claim 4, wherein the second coil comprises:
   a sixth portion extending from the other end of the second portion to the outer frame; and
   a seventh portion extending from the other end of the fourth portion to the outer frame.

6. The lens moving apparatus according to claim 5, further comprising:
   a first solder portion disposed on the outer frame of the first spring and on the second portion of the second coil; and
   a second solder portion disposed on the outer frame of the second spring and on the fourth portion of the second coil.

7. The lens moving apparatus according to claim 5, further comprising:
   a third solder portion disposed on the outer frame of the first spring and on the sixth portion of the second coil; and
   a fourth solder portion disposed on the outer frame of the second spring and on the seventh portion of the second coil.

8. The lens moving apparatus according to claim 4, wherein
   the third portion of the second coil is disposed on a first corner portion of the housing; and
   the fifth portion of the second coil is disposed on a second corner portion of the housing, which is adjacent to the first corner portion.

9. The lens moving apparatus according to claim 4, wherein the outer surface of the housing comprises:
   a first recess, in which the first portion of the second coil is disposed;
   a second recess, in which the third portion of the second coil is disposed, the second recess being connected to the first recess; and
   a third recess, in which the fifth portion of the second coil is disposed, the third recess being connected to the first recess.

10. The lens moving apparatus according to claim 4, wherein
    the second coil does not overlap the first coil in a direction parallel to an optical axis,
    the first portion of the second coil does not overlap the first coil in a direction perpendicular to the optical axis, and
    the second coil is located above the first coil based on the lower portion of the bobbin.

11. The lens moving apparatus according to claim 4, wherein the first portion of the second coil is disposed between the upper elastic member and the magnet.

12. The lens moving apparatus according to claim 4, wherein the first portion of the second coil does not overlap the magnet in a direction perpendicular to an optical axis.

13. The lens moving apparatus according to claim 4, wherein the first portion of the second coil overlaps the magnet in a direction parallel to an optical axis.

14. The lens moving apparatus according to claim 2, comprising:
    a base disposed below the lower elastic member; and
    a first connection terminal disposed on a first side surface of the base and connected to the first spring; and
    a second connection terminal disposed on the first side surface of the base and connected to the second spring.

15. The lens moving apparatus according to claim 14, comprising:
    a third connection terminal disposed on a second side surface of the base and connected to the third spring; and
    a fourth connection terminal disposed on the second side surface of the base and connected to the fourth spring.

16. The lens moving apparatus according to claim 15, wherein the first and second side surfaces of the base are opposite to each other,
    wherein a driving signal is configured to be applied to the third and fourth connection terminals, and
    wherein an induction voltage generated by an interaction between the first coil and the second coil is output through the first and second connection terminals.

17. The lens moving apparatus according to claim 1, wherein a driving signal is applied to the first coil, and wherein an induction voltage is generated by an interaction between the first coil and the second coil.

18. The lens moving apparatus according to claim 17, wherein the driving signal includes an alternating-current signal, or includes an alternating-current signal and a direct-current signal.

19. A lens moving apparatus comprising:
    a housing comprising a first protrusion and a second protrusion;
    a bobbin disposed in the housing;
    a first coil disposed in the bobbin;
    a magnet disposed in the housing, the magnet being disposed so as to correspond to the first coil;
    a second coil disposed on the housing;
    a first elastic member coupled to a lower portion of the bobbin,
    wherein the first elastic member comprises a first spring, a second spring, a third spring, and a fourth spring disposed so as to be spaced apart from each other,
    wherein the second coil comprises:
       a first portion disposed on a side surface of the housing;
       a second portion wound around the first protrusion and connecting the first spring;
       a third portion wound around the second protrusion and connecting the second spring;
       a first connection line connecting one end of the first portion and the second portion; and
       a second connection line connecting the other end of the first portion and the third portion, and
    wherein the first portion does not overlap with the first coil in a direction parallel to an optical axis and in a direction perpendicular to the optical axis.

20. A lens moving apparatus comprising:
    a housing comprising a first protrusion and a second protrusion;
    a bobbin disposed in the housing;
    a first coil disposed in the bobbin;
    a magnet disposed in the housing so as to correspond to the first coil;
    a second coil disposed on the housing;

an elastic member coupled to the bobbin and the housing;
a base disposed below the elastic member; and
first to fourth connection terminals disposed on the base,
wherein the elastic member comprises a first spring connecting the first connection terminal, a second spring connecting the second connection terminal, a third spring connecting the third connection terminal, and a fourth spring connecting the fourth connection terminal,
wherein the second coil is electrically connected to the first and second springs, and the first coil is electrically connected to the third and fourth springs,
wherein a driving signal is configured to be applied to the third and fourth connection terminals, and
wherein an induction voltage generated by an interaction between the first coil and the second coil is output through the first and second connection terminals.

* * * * *